(12) United States Patent
Skuriat et al.

(10) Patent No.: US 7,451,108 B1
(45) Date of Patent: Nov. 11, 2008

(54) METHOD AND SYSTEM FOR MEASURING TRADE MANAGEMENT PERFORMANCE

(76) Inventors: Paul G. Skuriat, 9 Faludon Drive, Georgetown (CA) L7G 1H6; Christopher J. Walsh, 51 Round Hill Rd., Kingston, MA (US) 02364; Lucy A. Lynch, 27 St. Mary's Ct., Brookline, MA (US) 02446

( * ) Notice: Subject to any disclaimer, the term of this patent is extended or adjusted under 35 U.S.C. 154(b) by 0 days.

(21) Appl. No.: 09/540,648

(22) Filed: Mar. 31, 2000

(51) Int. Cl.
| | |
|---|---|
| G06F 11/34 | (2006.01) |
| H04M 3/51 | (2006.01) |
| G06Q 40/00 | (2006.01) |
| H04K 1/00 | (2006.01) |
| H04L 9/00 | (2006.01) |

(52) U.S. Cl. .................. 705/37; 705/80; 705/11
(58) Field of Classification Search ............... 705/37, 705/7, 11, 35, 50–80; 379/111–132
See application file for complete search history.

(56) References Cited

U.S. PATENT DOCUMENTS

| | | | | |
|---|---|---|---|---|
| 5,297,031 | A | * | 3/1994 | Gutterman et al. ............ 705/37 |
| 5,497,317 | A | * | 3/1996 | Hawkins et al. ............... 705/37 |
| 5,600,576 | A | * | 2/1997 | Broadwater et al. .......... 702/187 |
| 5,727,165 | A | * | 3/1998 | Ordish et al. .................. 705/37 |
| 5,787,402 | A | * | 7/1998 | Potter et al. ................... 705/37 |
| 5,924,072 | A | * | 7/1999 | Havens .......................... 705/1 |

(Continued)

FOREIGN PATENT DOCUMENTS

| | | | |
|---|---|---|---|
| JP | 411288404 A | * | 10/1999 |
| WO | WO 99/56192 | | 11/1999 |

OTHER PUBLICATIONS

Definition of Six Sigma obtained from http://www.answers.com/six%20sigma. Last accessed Dec. 11, 2006.*
Ameritrade 10 second guarantee. Available @ http://www.amtd.com/newsroom/releasedetail.cfm?ReleaseID=180073, last accessed Dec. 11, 2006.*
Mitchell, Billy, "The Six Sigma appeal", pp. 41-47 Engineering Management Journal, Feb. 1992.*
White, Robert, "An introduction to Six Sigma with a design Example", pp. 28-35, 0-7803-0485-3/92, copyright 1992 IEEE.*

*Primary Examiner*—James P. Trammell
*Assistant Examiner*—Daniel L Greene
(74) *Attorney, Agent, or Firm*—Mintz Levin Cohn Ferris Glovsky and Popeo, PC

(57) ABSTRACT

Management of financial transactions involves defining the process as a series information transfers needed by parties to settle the transaction. A system measure the performance of participants in the management process, tracks information transferred between the parties and records a time the information is transferred. Information including time information is used to determine measures of performance. These measures of performance can include the amount of time between completion of any steps in the management process, e.g., from the time when transaction was initiated (e.g. a trade is executed) to the time the information to be transmitted to or received by any of the participants to the management process or the management system in any of the steps of the management process. The performance information can be compiled into predefined reports which allow a party to compare the performance of counterparties with which the party had completed transactions.

13 Claims, 5 Drawing Sheets

U.S. PATENT DOCUMENTS

| | | | |
|---|---|---|---|
| 5,963,914 A * | 10/1999 | Skinner et al. | 705/11 |
| 6,014,643 A * | 1/2000 | Minton | 705/36 R |
| 6,029,146 A * | 2/2000 | Hawkins et al. | 705/35 |
| 6,088,717 A * | 7/2000 | Reed et al. | 709/201 |
| 6,119,097 A * | 9/2000 | Ibarra | 705/11 |
| 6,141,649 A * | 10/2000 | Bull | 705/11 |
| 6,195,647 B1 * | 2/2001 | Martyn et al. | 705/37 |
| 6,247,000 B1 * | 6/2001 | Hawkins et al. | 705/37 |
| 6,310,949 B1 * | 10/2001 | Taylor et al. | 379/219 |
| 6,606,608 B1 * | 8/2003 | Bezos et al. | 705/36 R |

* cited by examiner

METHOD AND SYSTEM FOR MEASURING TRADE MANAGEMENT PERFORMANCE

COPYRIGHT NOTICE

Copyright, 1999, Thomson ESG, Incorporated. A portion of the disclosure of this patent document contains material which is subject to copyright protection. The copyright owner has no objection to reproduction by anyone of the patent document or the patent disclosure, as it appears in the U.S. Patent and Trademark Office patent file or records, but otherwise reserves all copyright rights whatsoever.

CROSS-REFERENCE TO RELATED APPLICATIONS

Not Applicable

STATEMENT REGARDING FEDERALLY SPONSORED RESEARCH

Not Applicable

REFERENCE TO MICROFICHE APPENDIX

Not Applicable

BACKGROUND OF THE INVENTION

This invention relates to the processing and management of securities transactions (trade management) and more particularly, to a method and system which provides a measure by which the performance of the trade management process can be evaluated.

A transaction is a process by which two or more parties exchange property (real property, goods, services or securities) for value. Thus, for example, a good (such as a book) may be purchased for an agreed price or an interest in a company in the form of stock may be purchased from a company or through a broker. After the parties to the transaction agree to enter into the transaction, the trade management process begins whereby the parties make arrangements to transfer the goods (or title thereto), securities or provide the services and transfer the funds to close the transaction. This process can also include independent third parties such as escrow agents and custodians who hold the property or payment of one party in anticipation of the transfer.

In simple transactions such as the sale of a book for cash, the transaction is essentially initiated and closed simultaneously, wherein the buyer takes title to the book at the same time the seller takes possession of the payment. In the case where the book is sold on credit, the buyer takes title in the book, but the seller must process the credit slip to receive payment at a later date. Any delay in the processing of the credit slip delays the payment and seller bears the burden of not having use of the funds associated with that sale. In addition, the transaction is not settled until the seller receives payment and seller bears the risk that the transaction may not get settled, i.e. that payment is never received.

In more complex transactions such as the sale of securities, the parties initiate the transaction according to exchange rules and agree to the settle the transaction at a later time. Typically, the process can be divided into a sequence of predefined steps involving the transfer of information needed to settle and close the transaction. For example, in securities transactions, the orderer, who can be either a buyer or a seller, issues a trade instruction to a broker/dealer and broker/dealer executes the trade and sends a notice of execution to the orderer. The orderer then transmits the trade details and allocations to the broker/dealer who can either accept or reject the trade details and allocations and transmits the acceptance or rejection back to the orderer. If the trade details and allocations are accepted, the broker/dealer provides additional information related to the trade and transmits a trade confirmation to the orderer. The orderer validates the information included in the trade confirmation and responds with an affirmation—representing the formation of a legally binding contract for the transaction. Both the orderer and the broker/dealer then transmit the trade to their respective settling agents whom arrange for the instructed exchange of cash and securities on settlement date.

There are third party organizations and entities that provide as a service, a system for facilitating the management of these transactions. These systems define the trade management process as a series of step requiring the transfer and reconciliation of information between the parties toward settlement of the transaction. For the sale of consumer goods, credit card companies and consumer banking institutions provide the systems which can use electronic finds transfers to settle credit and debit based transactions. For the securities markets, Thomson Financial Electronics Settlements Group, the assignee of the present application provides its OASYS™ and OASYS Global™ systems which facilitate the transfer of post-trade information used in the settlement of securities trades in U.S. and foreign markets, respectively. These systems are described in U.S. Pat. No. 5,497,317 assigned to the assignee of the present invention, which is hereby incorporated by reference in its entirety. These systems facilitate trade management by providing transaction and information services which facilitate the electronic exchange and agreement of trade information between trading parties following the negotiation. These services also store information which may be necessary for settling a trade and enabling that information to be transferred to the participants to the transaction (the orderer, the broker/dealer and the custodian) in order to close the transaction. As disclosed in the prior art, without these electronic systems, the information needed by each party would have to be exchanged manually, i.e. by a patchwork of telephone, facsimile and proprietary communication systems.

In the global securities markets, the settlement of securities transactions (i.e. the exchange of securities for payment) carries with it an inherent risk directly related to the length of time between trade and settlement. Markets worldwide have attempted to standardize this settlement cycle to within three days of the trade date (i.e. T+3 days) with an ultimate goal of shortening to T+1 or T+0. However, settlement cycles worldwide continue to range between T+1 and T+45. Given the risk, the organizations involved have mutually agreed to a specification that defines the information that needs to be conveyed between parties to a trade in order to facilitate post trade processing and settlement. In some instances, these types of systems and the organizations that operate them are regulated by various government and private agencies. For example, the Securities and Exchange Commission regulates transactions involving the transfer of securities and the exchanges that operate the markets where securities are traded. As of Jun. 1, 1995, the Securities and Exchange Commission has mandated that U.S. securities must be settled within three days of the trade date, (T+3). Prior to that date, U.S. securities had to be settled within five days of the trade date (T+5). Thus, transactions that are not settled within the time frame mandated by law result in settlement failure and represent a significant risk to both brokers and traders.

While the move from manual and paper based notification and confirmations to electronic systems have helped to ease the burden and facilitate the post-trade process, there is currently no objective means for evaluating the performance of the parties involved or the system as a whole. The participants do not have a means to objectively evaluating their own performance as well at that of their counterparties. Specifically, orderers and broker dealers do not have a means for objectively evaluating the performance of their trading counterparts nor do they have a means for objectively evaluating their own are performance relative to their peers or the market as a whole.

Accordingly, it is an object of this invention to provide a method and system for measuring or evaluating the performance of the participants to the post-trade process associated with the settlement of one or more transactions.

It is another object of this invention to provide an improved method and system for measuring or evaluating the performance of the participants to the post-trade process associated with the settlement of one or more transactions.

SUMMARY OF THE INVENTION

A transaction for the purchase or sale of a security includes at least three steps, the negotiation of the transaction, trade management and the settlement of the transaction. In accordance with the present invention, the trade management process can further be divided into a plurality of steps. These steps include: Providing a system for monitoring and/or facilitating each of the trade management process steps; Associating a time stamp with the completion of each step in the trade management process; and Determining as a function of the time stamps of each of the steps, a measure of the performance of the trade management process. The measure of performance can be, for example, an average or median time between the completion of any of the steps in the trade management process, a ranking of the participants to the trade management process based upon a time, such as an average or median time between completion of the steps or a measure of the variation or standard deviation of the time between the completion of any of the steps in the trade management process.

The present invention can be incorporated in a system used to facilitate the management of a transaction. That system can be adapted to receive and store trade-related information from one of the participants to the transaction and forward that trade-related information to the intended recipient or recipients. In accordance with the invention, the system can store that trade-related information in a database along with an indication of the time that the trade-related information was received or the amount of time that has lapsed from a predefined reference time. The system can be adapted to receive and store this trade-related information for a plurality of participants and for a plurality of transactions. The system can further include a reference database that can be used by the participants to store reference information concerning each participant and the system can include this reference information in the information forwarded to the other participants.

The system can further be adapted to periodically extract all or a portion of the data concerning each of the transactions to create a common trade interface database. The data in the common trade interface database can be aggregated on a periodic basis in order to determine the performance of individual participants with regard to the number of transactions processed during a given period as a function of the data in the common trade interface database. The system can further provide predefined reports and charts showing the performance of a given participant relative to their peers in a given market. The data from the common trade interface, the performance data and the predefined reports and charts can be stored in a system performance database.

In accordance with the present invention, the information stored in the performance database can be made available to users of the system over a data network. The performance database and an administrative database can be connected to a host server through a firewall. The users can connect to the host server to access the data stored in the performance database. The users can access the predefined reports as well as the data of the individual transaction records that is used to produce the predefined ports. The administrative database can be used to control user access to the data and to permit the users to generate customized reports as a function of the data stored in the performance database.

BRIEF DESCRIPTION OF THE DRAWINGS

The foregoing and other objects of this invention, the various features thereof, as well as the invention itself, may be more fully understood from the following description, when read together with the accompanying drawings in which.

DETAILED DESCRIPTION OF THE PREFERRED EMBODIMENTS

The present invention is directed to a method and system for producing information representative of the performance of one or more participants to a plurality of security transactions and a method and system for presenting the performance information to users in various levels of detail. As a person having ordinary skill in the art will appreciate, the invention can be applied to any transaction process which can be divided into a sequence of steps and at least one of those steps involves the transfer of information from one participant in the process to another. By way of example, in order to further illustrate the application of the invention, the invention is further described as embodied in a system for processing securities transactions.

Figure 1:
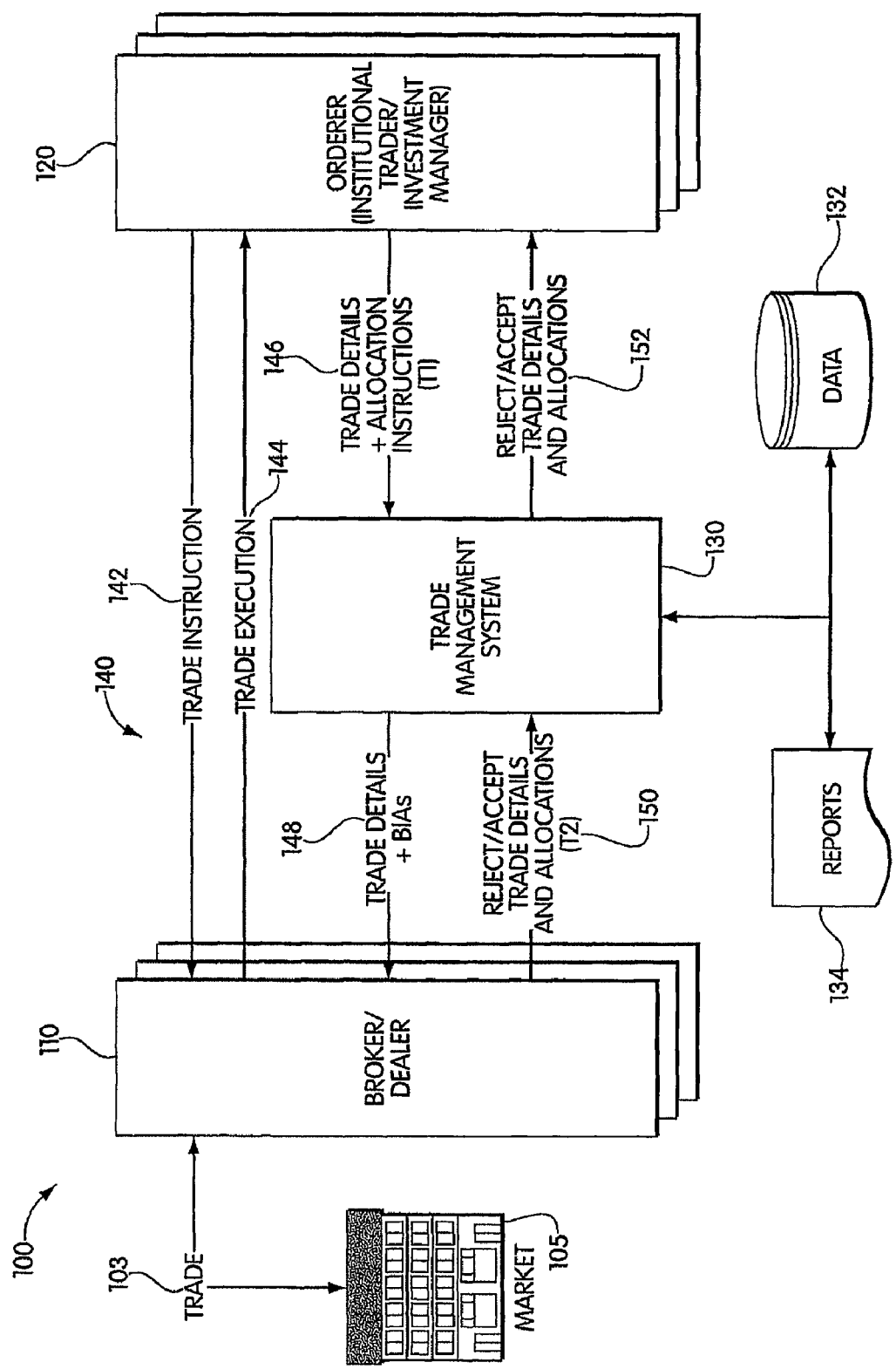
FIG. 1 is diagrammatic view of a trade management system and an associated system for measuring the performance of participants to a trade management process in accordance with one embodiment of the present invention.

FIG. 1 shows a diagram of a system 100 which can be used for processing and managing domestic securities transactions that includes a trade processing and tracking system 130 that is connected between one or more broker/dealer computer systems 110 and one or more orderer (institutional trader or investment manager) computer systems 120. FIG. 1 also shows the communications 140 that flow between the broker/ dealer systems 110 and the orderer systems 120 and the trade execution communications 103 that flow between the broker/dealer system 110 and the securities market 105.

In accordance with the invention, the process for executing and managing a trade is described in terms of the communications 140 that can be transferred between the broker/dealer system 110 and the orderer system 120. The process is initiated by the orderer system 120 issuing a trade instruction 142 to the broker/dealer system 110 which causes the broker/dealer system 110 to communicate a trade order 103 to the market 105 where the trade is executed. Once the trade is executed and the broker/dealer is notified, the broker/dealer system 110 communicates a notice of trade execution 144 to the orderer system 120. Upon receipt of the notice of trade execution 144, the orderer must transmit the trade details and allocation instructions to the broker/dealer. This can be accomplished by transmitting a trade details and allocation instruction message from the orderer system 120 to the broker/dealer system 110.

In accordance with the present invention, a trade management system 130 is provided between the broker/dealer system 110 and the orderer system 120 to facilitate the post-trade process and track the completion of each of the process steps in order to provide a measure of performance of the post-trade process and the responsiveness of the participants. The trade management system 130 can receive and store a copy of each of the communications transferred between the broker/dealer system 110 and the orderer system 120. The trade management system 130 can also modify the information contained in the communication 140 or append to the communication 140 as may be necessary to facilitate the post-trade process. This can be accomplished by providing the trade management system 130 with a reference database that enables the system 130 to cross-reference information contained in the communications 140 and substitute cross-reference information and/or append information to the communications 140 transferred between the orderer system 120 and broker/dealer system 110.

For example, the trade management system 130 can receive the trade details and allocation instructions 146 and can cross-reference broker internal account numbers (BIAs) from the orderer (investment manager) internal account numbers provided in the allocation instructions 146 and append the BIAs to the trade details and allocation instruction communication 146 to form communication 148 that is transmitted to the broker/dealer system 110. In response to the trade details and allocation instruction communication 148 received from the orderer system 120, the broker/dealer can decide whether to accept or reject each individual allocation and cause the broker/dealer system 110 to issue an acceptance or rejection communication 150 to the orderer system 120. The trade management system 130 can receive the acceptance or rejection communication 150 and forward the acceptance or rejection communication 152 to the orderer system 120. Once all the trade details and allocations are accepted, the trade is settled.

In addition to processing the trade communications 140, the trade management system 130 can record a copy of each communication 140 and record the time that each communication is completed and received by the trade management system 130 to provide a historical record of the completion of each of the steps in the post-trade process. The trade management system 130 can also record other information characteristic of post-trade process depending upon the configuration of the system. For example, if the trade management system 130 is a store and forward system, communications 140 are transmitted to and stored at the trade management system 130 and recipient party must periodically query the trade management system 130 for new communications 140 and the trade management system 130 can record the time when the party actually receives the communication 140. Alternatively, in a relay system where the trade management system 130 actually transmits the communication 140 to the intended recipient, the trade management system 130 can record the time when the recipient acknowledges receipt of the communication 140.

As shown in FIG. 1, the trade management system 130 records the trade details and allocation instructions 146 as well as the time T1 that the complete communication 146 is received by the system 130. The trade management system 130 also records the broker/dealer trade rejection or acceptance communication 150 and the time T2 that the complete communication 150 is received by the system 130.

The trade information can be stored in a database 132 and used to generate reports 134 that log the post-trade process of each transaction. The trade information can also be used to produce reports and information representative the performance the post-trade process. Preferably, the trade information is stored in a computer system designed to store transactional information such as a Solaris Transaction Server (available from Sun Microsystems, Inc., Palo Alto, Calif.) running a Sybase database software (available from Sybase, Inc., Emeryville, Calif.). The broker/dealer systems 110 and the orderer systems 120 can connect to the trade management system 130 via any known means for transferring information, such as a dialup Connection using computer modems, over a private network or virtual private network or over a public network such as the internet.

Figure 2:
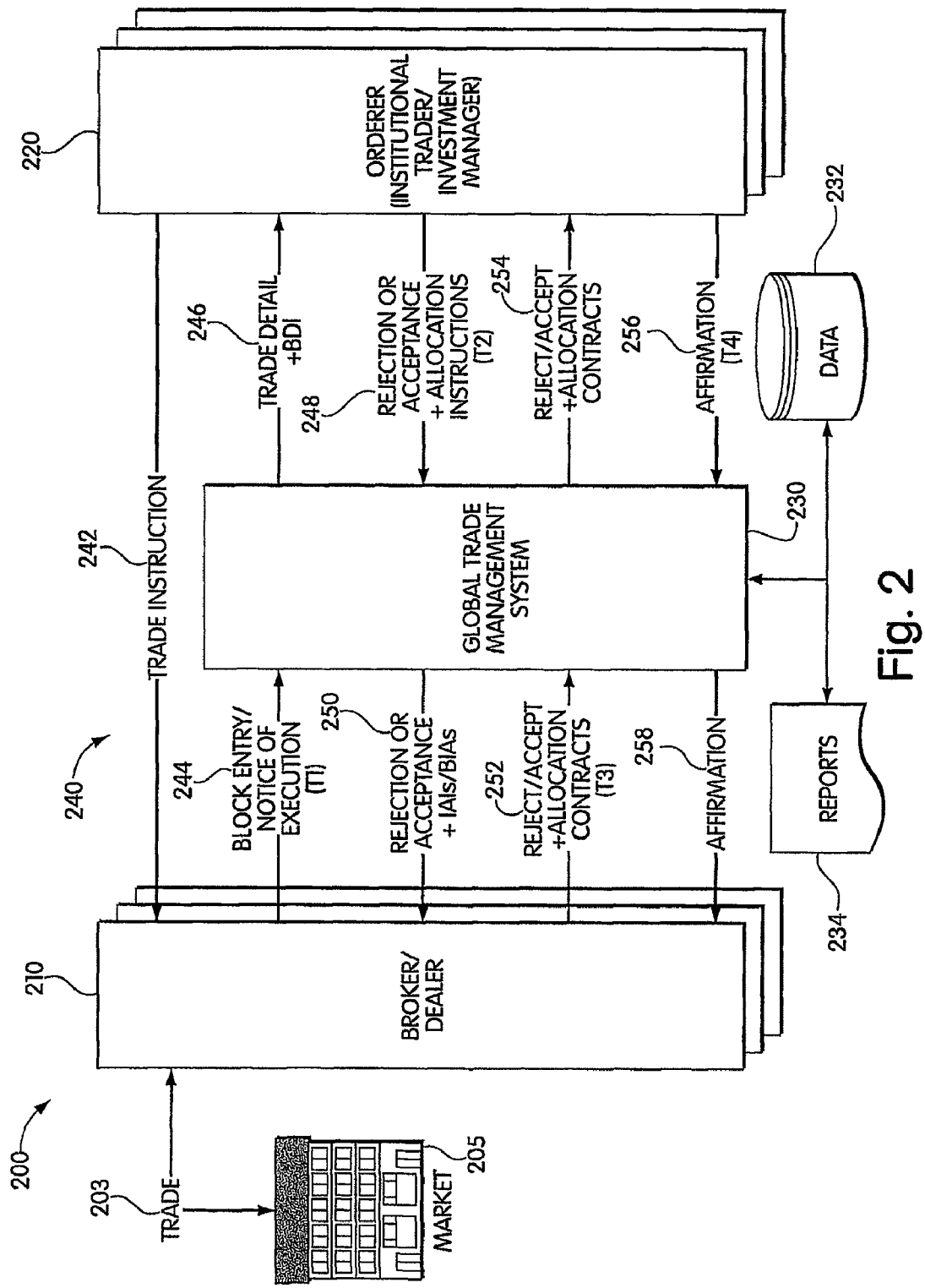
FIG. 2 is diagrammatic view of a trade management system and an associated system for measuring the performance of participants to a trade management process in accordance with another embodiment of the present invention.

FIG. 2 shows a diagram of a system 200, similar to the system shown in FIG. 1, which can be used for processing and managing global or international securities transactions. Like the system shown in FIG. 1, the global system 200 can include a global post-trade processing and tracking system 230 that is connected between one or more broker/dealer computer systems 210 and one or more orderer (institutional trader or investment manager) computer systems 220, which can be located in different countries or geographic jurisdictions. FIG. 2 also shows the communications 240 that flow between the broker/dealer systems 210 and the orderer systems 220 and the trade execution communications 203 that flow between the broker/dealer system 210 and the securities market 205.

The process for executing and managing a cross-border trade is described terms of the communications 240 that are transferred between the broker/dealer system 200 and the orderer system 220. The process is initiated by the orderer system 220 issuing a trade instruction 242 to the broker/dealer system 210 which causes the broker/dealer system 210 to communicate a trade order 203 to the market 205 where the trade is executed. Once the trade is executed and the broker/dealer is notified, the broker/dealer system 210 communicates a block entry and notice of trade execution 244 to the orderer system 220. Upon receipt of the block entry and notice of trade execution 244 from the broker/dealer, the orderer must either accept or reject the details of the block entry and notice of execution 244. Assuming the details of the block entry 246 are accepted, the orderer system 220 transmits the trade acceptance and allocation instructions 248 to the broker/dealer system 210. This can be accomplished by transmitting an allocation instruction message 248 from the orderer system 220 to the broker/dealer system 210. The trade acceptance and allocation instruction communication 250 is received from the orderer system 220 by the broker/dealer system 210. In response to the allocation instructions 250, the broker/dealer system 210 transmits an acceptance or rejection of each allocation instruction as well as contract notes for each accepted allocation in a communication 252 which is transferred to the orderer system 220. After the last allocation is accepted, the orderer system 220 transmits a trade affirmation communication 256 to the broker/dealer system 210.

In accordance with the present invention, a global trade management and tracking system 230 is provided between the broker/dealer system 210 and the orderer system 220 to facilitate the post-trade process and track the completion of each of the process steps in order to provide a measure of performance of the post trade process and the responsiveness of the participants. The trade management system 230 can receive and store a copy of each of the communications 240 transferred between the broker/dealer system 210 and the orderer system 220. The trade management system 230 can also modify the information contained in the communication 240 or append to the communication 240 as may be necessary to facilitate the post-trade process. This can be accomplished by providing the trade management system 230 with a reference database that enables the trade management system 230 to cross-reference information contained in the communications 240 and substitute cross-reference information and/or append information to the communications 240 transferred between the orderer system 220 and broker/dealer system 210.

For example, the trade management system 230 can receive the block entry and notice of execution communication 244 and can cross-reference broker information from the information provided in the block entry communication 244 and append the Broker Delivery Instructions (BDIs) to the trade details and allocation instruction communication 244 to form communication 146 that is transmitted to the broker/dealer system 210. In response to the trade details and BDI communication 246, the orderer must determine whether to accept or reject the trade details. Assuming the trade details are acceptable, the orderer system 220 transmits an acceptance and allocation instruction communication 248 to the broker/dealer system 210. The trade management system 230 can receive the acceptance and allocation instruction communication 248 and can cross-reference information from the acceptance and allocation instruction communication 248 and append the orderer Investment Account Instructions (IAIs) and Broker Internal Account numbers (BIAs) to the acceptance and allocation instruction communication 248 to form communication 250 that is transmitted to the broker/dealer system 210. In response to the allocation instruction communication 250 received from the orderer system 220, the broker/dealer must decide whether to accept or reject each individual allocations. Assuming the allocations are acceptable, the broker/dealer system 110 can issue an acceptance and allocation contract notes in a communication 252 transmitted to the orderer system 220. The trade management system 230 can receive the acceptance and allocation contract notes or rejection communication 252 and forward the acceptance and allocation contract notes or rejection communication 254 to the orderer system 220. In the last step of the process, the orderer affirms the allocation contracts and the orderer system 220 send an affirmation communication 256 to the broker/dealer system 210, affirming the trade.

In addition to processing the communications 240, the trade management system 230 can record a copy of each communication 240 and record the time that each communication is completed and received by the system 230 to provide a historical record of the completion of each of the steps in the post-trade process. The trade management system 230 can also record other information characteristics of the post-trade process depending upon the configuration of the system. For example, if the trade management system 230 is a store and forward system, communications 240 are transmitted to and stored at the trade management system 230 and recipient party must periodically query the trade management system 230 for new communications 240 and the trade management system 230 can record the time when the party actually receives the communication 240. Alternatively, in a relay system where the trade management system 230 actually transmits the communication 240 to the intended recipient, the trade management system 230 can record the time when the recipient acknowledges receipt of the communication 240.

As shown in FIG. 2, the trade management system 230 records the block entry and notice of execution communication 244 as well as the time T1 that the complete communication 244 is received by the trade management system 230. In subsequent steps, the trade management system 230 records each rejection communication or acceptance and allocation instruction communications 248 from the orderer system 220 and the time T2 that the completed communication (the acceptance) is received by the trade management system 230; each rejection communication or acceptance of allocation instruction and contract note communication 252 and the time T3 that the completed communication (acceptance) is received by the trade management system 230; and the affirmation communication 256 received from the orderer system 220 and the T3 that the communication is received by the trade management system 230.

The trade information including the time information can be stored in a database 232 and used to generate reports 234 that log the post-trade process of each transaction. The information can also be used to produce reports and information representative the performance the post-trade process. Preferably, the trade information is stored in a computer system designed to store transactional information such as a Solaris Transaction Server (available from Sun Microsystems, Inc., Palo Alto, Calif.) running Sybase database software (available from Sybase, Inc., Emeryville, Calif.). The broker/dealer systems 210 and the orderer systems 220 can connect to the trade management system 230 via any known means for transferring information, such as a dial-up connection using computer modems, over a private network or virtual private network or over a public network such as the internet.

As a person having ordinary skill will appreciate, the invention can be applied to any transaction system in which the process includes a plurality of steps involving the communication of information. As evidenced by the embodiments shown in FIGS. 1 and 2, the invention can be adapted and applied to different transaction processes. In accordance with the invention, the trade management system can be configured as required to obtain the information needed to evaluate the performance and responsiveness of one or more parties to the trade management process by selectively the recording time information concerning the communications generated by the parties and at the steps in the post-trade process to be evaluated. Thus, for example, in FIG. 1, the trade management system 130 could be adapted to report the performance of the broker/dealer in executing the trade instruction by recording the time that the trade instruction is issued to or received by the broker/dealer and the time that the trade execution is issued to or received by the orderer.

In accordance with the invention, the trade information including the time information can be processed by a separate reporting system (not shown) to aggregate the data and produce reports indicating the performance of the broker/dealers and the orderers as a function of the trade information and the time information gathered by the trade management system 130 or 230.

Figure 3:
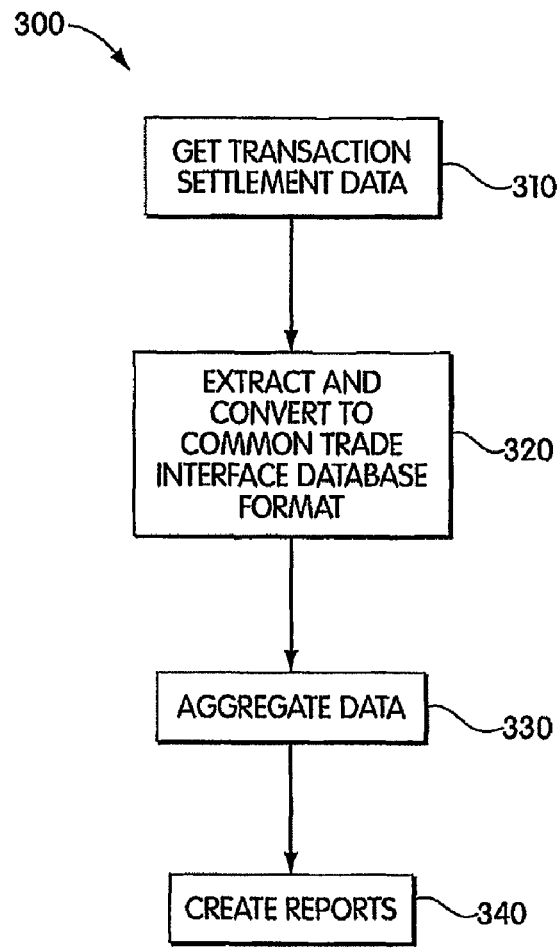
FIG. 3 is a flow chart of a process of producing information and reports representative of the performance of various participants to securities transactions.

As shown in FIG. 3, the trade information including the time information can be processed to facilitate the performance reporting function. In accordance with the invention, the trade information including the time information is gathered in real time at step 310. On a periodic basis, the trade information including the time information is extracted from the trade database 132 or 132 and converted to a common trade interface database in step 320. The common trade interface database can be designed and configure to allow the performance information to be more easily generated. In step 330, the performance information can be aggregated to generate performance information and reports as a function of the trade information including the time information (such as daily, weekly or monthly) as need to generate periodic (daily, week or monthly) reports In step 340, the reporting system uses the performance information to produce predefined performance reports.

Figure 4:
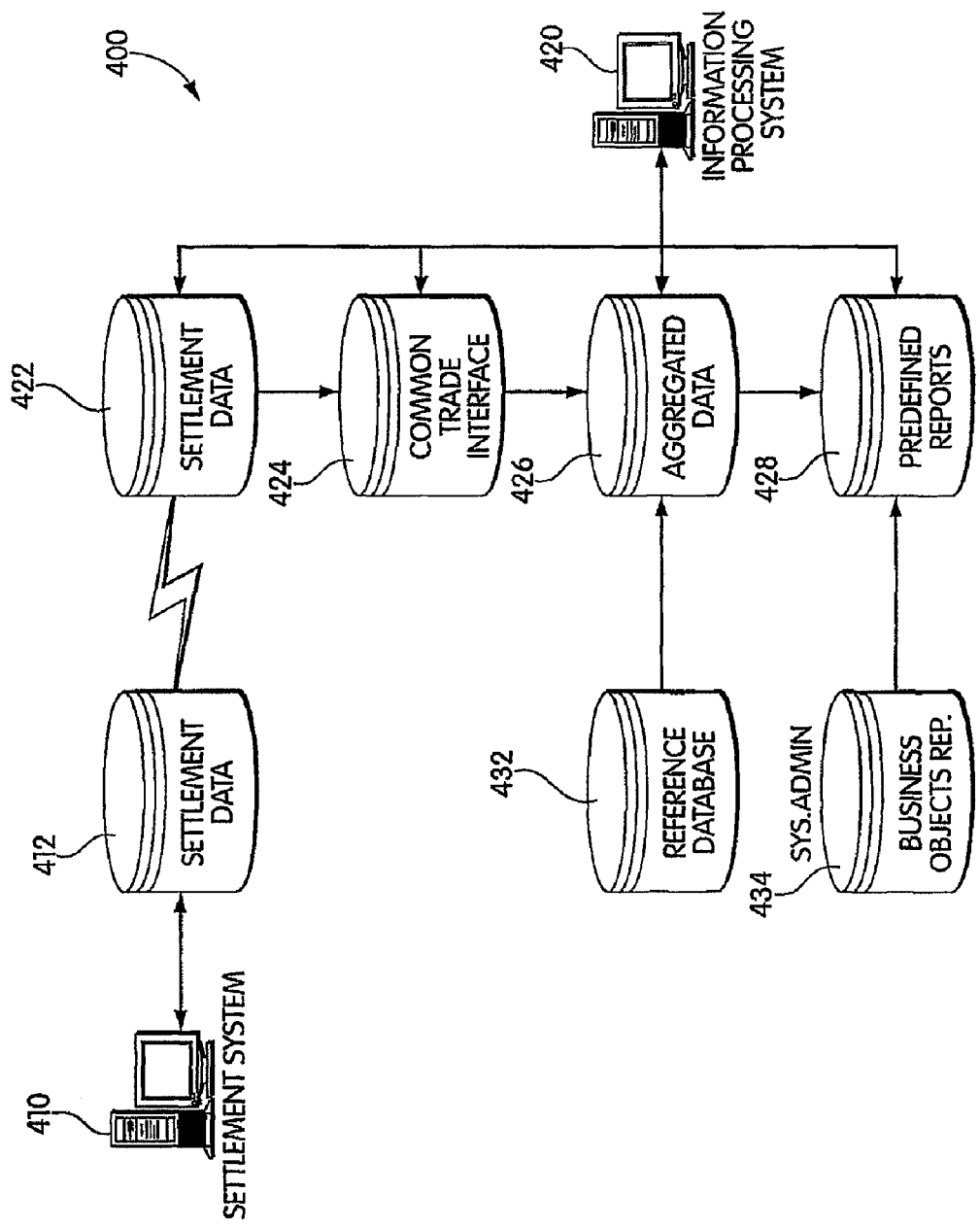
FIG. 4 is a diagrammatic view of a system for producing a performance database containing information and reports representative of the performance of various participants to securities transactions.

FIG. 4 shows a diagrammatic view of the system 400 for producing the predefined performance reports. In accordance with the invention, the trade information including the time information is stored in a database 412 at the trade management system 410. Database 412 can be the same database used by the trade management system 130 or 230 described above to gather trade information including the time information or preferably, the information can be copied or replicated, periodically (such as hourly, daily or weekly), into a separate database 422 such as an archival database as part of a separate information processing system 420. This will depend upon the processing power of the trade management system and processing requirements of the performance reporting system, i.e. how much post-trade information is generated and quickly the information needs to be processed to produce the performance reporting information.

The data in the trade database 422 is processed and used to create a common trade interface (CTI) database 424. The data from the trade database 422 which includes each of the communications along with time information for each transaction is processed to create a record for each transaction in the CTI database 424 which includes the time information for each step or communication in the post-trade process that is recorded. The data in the CTI database 424 is processed and used to create the performance reporting system database 426 which includes the aggregated data. The data in the CTI database 424 is sorted and organized by participant and used to perform statistical calculations, such as generating an average time for a broker to send acceptance of the trade details over the period evaluated and with respect to each individual trader that processed trades with that broker that is stored in the performance reporting system database 426. Thus, for example, the system can report Broker A may, for the period and market evaluated, have an average time to accept trade details of 45.6 hours (1.9 days), however because of unforeseen events, Broker A may have taken on average 69.6 hours (2.9 days) to accept trade details of trades involving Trade X. It also may be reported that for a given market, the average time to accept trade details may be 64.8 (2.7 days). Thus, the information stored in the CTI database 426 can be aggregated and stored in the performance reporting system database 426. In addition, the information can be further formatted and stored in the form of predefined reports a predefined reports database 428. Additional information such as cross-references between broker/dealer ID numbers and broker/dealer names, time zones of participants and the identification of weekends and local holidays are stored in the reference database 432 and can be used by the system to process the information to modify the performance information reported.

The information processing system 420 can be implemented using conventional database software such as that available from Sybase, Inc of Emeryville, Calif. or Oracle Corporaton of Redwood Shores, Calif. on conventional computing platforms including Sun Solaris computers (available from Sun Microsystems, Inc., Palo Alto, Calif.) and so called Intel based IBM compatible computers (for example, available from Compaq Computer Corporation, Houston Tex. and International Business Machines of Armonk, N.Y.). Other database processing systems, such as those based upon the LINUX or UNIX operating systems can also be used.

Figure 5:
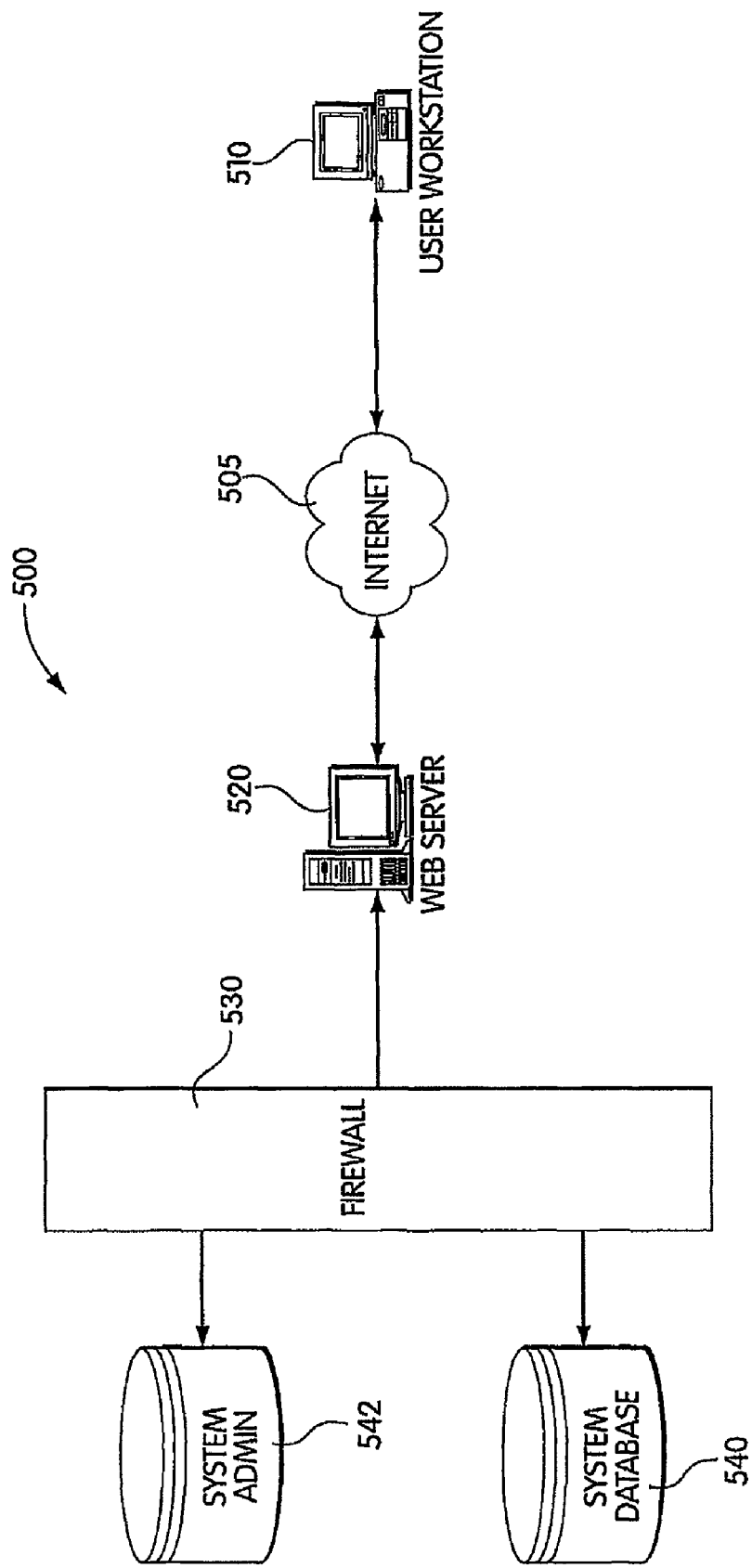
FIG. 5 is a diagrammatic view of a system for permitting users to access the information and reports representative of the performance of various participants to securities transactions.

The information from performance reporting system database 426 as well as the predefined reports stored in predefined reports database 428 can be used to provide the reporting function to end users of the performance information such as the participants to the transactions and regulatory authorities. As shown in FIG. 5, the system database 540 can include the performance reporting system database 426 and the predefined reports database 428 and provide access to this information to a web server 520 through a firewall 530 to user workstations 510 via the internet 505 or any other public or private data network. In accordance with the invention, the performance data can be provided in the form of tables according the level of access need by the end user.

As a person having ordinary skill will appreciate, the performance information presented can vary depending upon the needs of the end user. Appendix A provides further examples of definitions for reports that can be produced in accordance with the method and system of the present invention. For purposes of illustration, the following tables provide examples of the performance and reporting information that can be provided. Table A provides an example of a Trade Entry Delay Report that may be provided to a Orderer representing the performance of one or more of the broker/dealers that completed transactions with the Orderer over a predefined period (such as a day, a week, a month, a quarter or a year). The average time reported is the average amount of time in hours that lapsed between the time the market closed on the trade date to the time the notice of execution issued by the broker/dealer was received by the trade management system for the transactions processed over a predefined evaluation period.

TABLE A

| Broker Name | Broker Acronym | Block Level Indicator | Trades Counted | Average time from Execution to Receipt | Detail |
|---|---|---|---|---|---|
| Friendly Securities | FSEC | Y | 13 | 0.27 | * |
| Byron Associates | BYATES | Y | 44 | 1.05 | * |
| DWT & Sons | DWTS | Y | 80 | 1.08 | * |
| Porterhouse & Co. | PTHS | Y | 393 | 1.13 | * |
| TTW Corp. | TTW28L | Y | 12 | 1.2 | * |

Where the Broker Name is the name of the submitting Broker/Dealer,Broker/Dealer; Broker Acronym is the Broker Acronym; the Block Level Indicator indicates that the Broker/Dealer is a block level institution,institution; Trades Counted is the number of trades evaluated during a predefined time period and used to determine the average time from execution to receipt. The average time from execution to receipt is measured from the trade execution time entered by the broker/dealer to the time that the trade management system received the Block Entry (i.e. notice of execution and trade details). Alternatively, the average time from execution to receipt could be measured from an arbitrary time on the trade date, such as market close, noon or market open (e.g. if the trade time is not entered by broker/dealer or is invalid) to the time that the trade management system received the Block Entry. In addition, the orderer can limit the report to broker/dealers with more than a specified number of trades in the predefine evaluation period.

The detail column can allow the user to access the detailed view of the information used to generate the line entry in the table. For example, Table B shows the detailed view of the information regarding trades between an orderer and Friendly Securities (FSEC) for the evaluation time period. As one of ordinary skill will appreciate, Table B can be stored as a predefined report or generated upon request as a query for all transactions between a specific orderer and a specific broker/dealer in a specified time period.

TABLE B

| Entered Trade Date | Settlement Date | Ref. No. | Buy/Sell | No. of Shares | Security Code | Security Description | Time to Block Entry | Detail |
|---|---|---|---|---|---|---|---|---|
| 29.10.99 | 03.11.99 | 5072095 | B | 400 k | SEDOL 888888 | Equity-UK | 4.8 | * |
| 29.10.99 | 03.11.99 | 5072050 | B | 613 k | SEDOL 888888 | Equity-UK | 4.5 | * |
| 29.10.99 | 03.11.99 | 5072051 | B | 905 k | SEDOL 888888 | Equity-UK | 4.5 | * |
| 29.10.99 | 03.11.99 | 5072049 | B | 905 k | SEDOL 888888 | Equity-UK | 4.47 | * |
| 29.10.99 | 03.11.99 | 5072090 | S | 84 k | SEDOL 888888 | Equity-UK | 2.2 | * |
| 29.10.99 | 03.11.99 | 5072079 | B | 400 k | SEDOL 888888 | Equity-UK | 2.18 | * |
| 29.10.99 | 03.11.99 | 5072080 | S | 97 k | SEDOL 888888 | Equity-UK | 2.18 | * |
| 29.10.99 | 03.11.99 | 5072081 | S | 32 k | SEDOL 888888 | Equity-UK | 2.18 | * |
| 29.10.99 | 03.11.99 | 5072082 | S | 29.7 k | SEDOL 888888 | Equity-UK | 2.17 | * |
| 29.10.99 | 03.11.99 | 5072083 | B | 332 k | SEDOL 888888 | Equity-UK | 2.17 | * |
| 29.10.99 | 03.11.99 | 5072084 | B | 252 k | SEDOL 888888 | Equity-UK | 2.17 | * |
| 29.10.99 | 03.11.99 | 5072085 | S | 83 k | SEDOL 888888 | Equity-UK | 2.17 | * |

Where the Trade Date is the date entered by the broker/dealer; Settlement Date is the settlement date entered by the broker/dealer; the Buy/Sell code indicates whether the transaction was a buy or sell transaction; No. of Shares is the quantity of shares traded by the broker/dealer; Security Code is security code and identifier (SEDOL, CUSIP, etc.) entered by the broker/dealer; Security description is the type of security; Time to Block Entry is the actual time (e.g. the difference in hours) between trade execution (as entered by the broker/dealer or an arbitrary time as stated above) and the time the complete trade entry instruction is received by the trade management system.

The Detail column can allow the user to access the detailed view of the data used to generate the line entry in the table. For example, Table C shows the detailed view of the individual trade data that is used to produce the performance information and reports in accordance with the present invention. As one of ordinary skill will appreciate, Table C can be stored as a predefined report or generated upon request as a query for all transactions between a specific orderer and a specific broker/dealer in a specified time period.

TABLE C

| | |
|---|---|
| Entered Trade Date | Fri 29 Oct 1999 |
| Settlement Date | Wed 03 Nov 1999 |
| Buy/Sell | B |
| Number of Shares | 631000 |
| Security Code | SEDOL 888888 |
| Security Description | Equity - UK |
| IS IN | GB3675600005 |
| Price Per Share | 3057.28 |
| Maturity Date | |
| Trading Currency Code | GBP |
| Gross Amount | 1929145005 |
| Net Amount | |
| Number of Allocations | 68 |
| Trade Date and Time | Fri 29 Oct 1999 06:00 GMT |
| Block Received by System | Fri 29 Oct 1999 10:30 GMT |
| Allocations Received by System | Fri 29 Oct 1999 11:22 GMT |

TABLE C-continued

| | |
|---|---|
| Contract(s) Received by System | Fri 29 Oct 1999 11:48 GMT |
| Affirmation(s) Received by System | Fri 29 Oct 1999 12:26 GMT |
| First Rejection Received | |
| Cancellation Received | |
| Current Status | Affirmed |

Where the Trade Date is the date entered by the broker/dealer; Settlement Date is the settlement date entered by the broker/dealer; the Buy/Sell code indicates whether the transaction was a buy or sell transaction; No. of Shares is the quantity of shares traded by the broker/dealer; Security Code is security code and identifier (SEDOL, CUSIP, etc.) entered by the broker/dealer; Security description is the type of security; ISIN code is the ISIN code from the system reference database; Price Per Share is the price entered by the broker/dealer; Maturity Date is maturity date of the security entered by the broker/dealer; Trading Currency Code is the trading currency entered by the broker/dealer; Gross Amount is the number of share multiplied by the price per share; Net Amount is the net amount entered by the broker/dealer (e.g. the gross amount less any commissions, taxes and other charges); Number of Allocations is the number of allocations of the trade (if applicable); Trade Date and Time is the date and time (adjusted to Greenwich Mean Time—GMT) the trade was entered by the broke/dealer; Block Received is the date and time (GMT) that the block level entry is received by the trade management system; Allocation(s) Received is the date and time (GMT) that the allocation instructions are received by the trade management system; Contract(s) Received is the date and time (GMT) that the allocation contracts are is received by the trade management system; Affirmations Received is the date and time (GMT) that the affirmations are received by the trade management system; First Reject Received is the date and time (GMT) that the first rejection notice is received by the trade management system; Cancellation Received is the date and time (GMT) that the cancellation notice is received by the trade management system; and Current Status is the status of the trade as of the date the report was generated.

In accordance with the present invention, the system can be adapted to report the performance of trade management process with respect to any time recorded event (e.g. where the trade management system records the time of completion of that event such as when a communication is received). As a person having ordinary skill in the art will appreciate, it is not necessary for the start time be entered or recorded by the trade management system, the start time can be any reference time and can be arbitrarily selected, for example, as the time the market opened on the trade date, noon on the trade date or the time the market closed on the trade date.

The invention may be embodied in other specific forms without departing from the spirit or essential characteristics thereof. The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein.

What is claimed is:

1. A system providing a measure of performance of participants to a trade management process, said trade management process including transmitting trade-related information between said participants, said system comprising:

a trade management system configured to receive at least two post-trade communications including first and second communications, at least said first communication is from a first participant to said trade management process, each of said first and second communications including information associated with one or more steps in a process for closing a trade;

a database configured to store time-of-completion information including at least one time-of-completion value representative of a time of completing at least a selected step of said steps in a process for closing a trade measured from a start time, wherein said time-of-completion value is recorded when said first communication is received by said trade management system; and a processor configured to generate a post-trade measure of performance, with respect to said first participant, as a function of a difference between said start time and said time-of-completion, said measure of performance being a function of a time elapsed between completion of successive ones of said steps in said process for closing a trade.

2. A system according to claim 1 wherein said second communication received by said trade management system is from said first participant to said trade management process;

said database being configured to store time information including time values representative of times when said first and second communications are received by said trade management system; and said processor being configured to generate a measure of post-trade performance with respect to said first participant as a function of a further difference of said time when said first and second communications are received by said trade management system.

3. A system according to claim 1 wherein said second communication is received from a second participant to said trade management process;

said database being configured to store time information including at least one time value representative of a time when said second communication is received by said trade management system; and said processor being configured to generate a measure of post-trade performance of said second participant with respect to said first participant as a function of said time information.

4. A system according to claim 1 wherein said second communication is received from a second participant to said trade management process;

said database being configured to store time information including at least one time value representative of a time when said second communication is received by said trade management system; and said processor being configured to generate a measure of post-trade performance of said first participant and a measure of post-trade performance of said second participant as a function of said time information.

5. The system of claim 1 wherein:

said first communication includes trade details and allocation instructions; and said second communication includes a response to said first communication.

6. The system of claim 1 wherein:

said first communication includes a notice of execution; and said second communication includes a response to said first communication.

7. A system providing a measure of performance of participants to a trade management process, said trade management process including transmitting trade-related information between said participants, said system comprising:

a trade management system coupled to a network and configured to receive a first post-trade communication from a first participant to said trade management process, said communication including information associated with a step in a process for closing a trade;

a communication recording system coupled to said trade management system and configured to record time information including a start time and at least one time value representative of a time when said first communication is received by said trade management system; and an information processing system coupled to said trade management system and configured to generate a measure of post-trade performance with respect to said first participant as a function of a difference between said start time and said at least one time value.

8. A system according to claim 7 wherein said trade management system is adapted to receive a plurality of post-trade communications from said first participant to said trade management process;

said communication recording system is configured to record time information including at least one time value representative of a time when at least two of said plurality of communications is are received by said trade management system; and said information processing system is configured to generate a measure of post-trade performance, with respect to said first participant, as a function of a further difference between said start time and said time information for said at least two of said plurality of communications received by said trade management system.

9. A system according to claim 7 wherein said trade management system is adapted to receive a second post-trade communication from a second participant to a second trade management process;

said information recording system is configured to record time information including at least one time value representative of a time when said second communication is received by said trade management system; and said information processing system is configured to generate a measure of post-trade performance of said second participant with respect to said first participant as a function of a further difference between said start time and said at least one time value representative of said time when said second communication is received.

10. A system according to claim 7 wherein said trade management system is configured to receive a second post-trade communication from a second participant to said trade management process;

said information recording system is configured to record time information including at least one time value representative of a time when said second communication is received by said trade management system; and said information processing system is configured to generate a measure of post-trade performance of said first participant and a measure of performance of said second participant as a function of a further difference between said start time and said time value representative of a time when said second communication is received.

11. A method of providing a measure of performance of participants to a trade management process, said trade management process including transmitting trade-related communications between said participants, said method comprising:

providing a trade management system adapted for receiving said trade-related communications sent between said participants;

receiving a first post-trade communication from a first participant to said trade management process including information associated with one or more steps in a process for closing a trade;

receiving a second post-trade communication from said first participant or from a second participant to said trade management process including information associated with a selected step of said steps in a process for closing a trade;

recording time information including time values representative of said times when said first communication and when said second communications are received by said trade management system; and generating a measure of post-trade performance, with respect to said first participant, as a function of said time elapsed between said first communication and said second communication.

12. The method of claim 11 wherein:

receiving the first communication includes receiving trade details and allocation instructions; and receiving the second communication includes receiving a response to the first communication.

13. The method of claim 11 wherein:

receiving the first communication includes receiving a notice of execution; and receiving the second communication includes receiving a response to the first communication.

* * * * *